(12) United States Patent
Takahashi et al.

(10) Patent No.: US 9,647,502 B2
(45) Date of Patent: May 9, 2017

(54) STATOR AND ROTATING ELECTRIC MACHINE

(71) Applicant: DENSO CORPORATION, Kariya, Aichi-pref. (JP)

(72) Inventors: Yuki Takahashi, Obu (JP); Masahiro Seguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 170 days.

(21) Appl. No.: 14/707,799

(22) Filed: May 8, 2015

(65) Prior Publication Data

US 2015/0326086 A1 Nov. 12, 2015

(30) Foreign Application Priority Data

May 8, 2014 (JP) ................................ 2014-096807

(51) Int. Cl.
| | | |
|---|---|---|
| H02K 15/12 | (2006.01) | |
| H02K 3/12 | (2006.01) | |
| H02K 3/34 | (2006.01) | |
| H02K 3/30 | (2006.01) | |
| H02K 3/38 | (2006.01) | |
| H02K 3/50 | (2006.01) | |
| H02K 9/19 | (2006.01) | |

(52) U.S. Cl.
CPC ............... *H02K 3/12* (2013.01); *H02K 3/30* (2013.01); *H02K 3/34* (2013.01); *H02K 3/345* (2013.01); *H02K 3/38* (2013.01); *H02K 3/50* (2013.01); *H02K 9/19* (2013.01); *H02K 2213/03* (2013.01)

(58) Field of Classification Search
CPC .. H02K 3/30; H02K 3/34; H02K 3/38; H02K 3/12

USPC ......... 310/45, 201, 202, 203, 204, 205, 206, 310/207, 208; 29/596
See application file for complete search history.

(56) References Cited

U.S. PATENT DOCUMENTS

| | | | |
|---|---|---|---|
| 2010/0141078 A1 | 6/2010 | Kouda et al. | |
| 2010/0244615 A1* | 9/2010 | Kouda | H02K 3/34 310/215 |
| 2012/0007462 A1 | 1/2012 | Kouda et al. | |
| 2014/0184012 A1* | 7/2014 | Seguchi | H02K 3/50 310/201 |

FOREIGN PATENT DOCUMENTS

| | | |
|---|---|---|
| JP | S62-293952 A | 12/1987 |
| JP | 2005-304223 A | 10/2005 |
| JP | 2007-336725 A | 12/2007 |
| JP | 2009-095167 A | 4/2009 |

\* cited by examiner

*Primary Examiner* — Hanh Nguyen
(74) *Attorney, Agent, or Firm* — Oliff PLC

(57) ABSTRACT

A stator includes an annular stator core, a stator coil and a resin adhesive. The stator coil is comprised of a plurality of electric wires. The electric wires are partially received in slots of the stator core so that the stator coil has a pair of coil end parts protruding outside the slots respectively from opposite axial end faces of the stator core. The resin adhesive is filled in the slots of the stator core and/or applied to the coil end parts of the stator coil. Moreover, each of the electric wires includes an electric conductor and an insulating coat that covers an outer surface of the electric conductor. The insulating coat is two-layer structured to include an inner coat and an outer coat. The adhesion strength of the outer coat to the resin adhesive is lower than the adhesion strength of the inner coat to the resin adhesive.

14 Claims, 9 Drawing Sheets

ABOUT 3m

STATOR AND ROTATING ELECTRIC MACHINE

CROSS-REFERENCE TO RELATED APPLICATION

This application is based on and claims priority from Japanese Patent Application No. 2014-96807, filed on May 8, 2014, the content of which is hereby incorporated by reference in its entirety into this application.

BACKGROUND

1 Technical Field

The present invention relates to stators and rotating electric machines that include the stators and are used in, for example, motor vehicles as electric motors and electric generators.

2 Description of Related Art

There are known rotating electric machines that are used in, for example, motor vehicles as electric motors and electric generators. Those rotating electric machines generally include a rotor and a stator. The stator includes an annular (or hollow cylindrical) stator core and a stator coil. The stator core is disposed in radial opposition to the rotor and has a plurality of slots that are formed in the stator core so as to be spaced from one another in the circumferential direction of the stator core. The stator coil is comprised of a plurality of electric wires that are mounted on the stator core so as to be received in the slots of the stator core.

Japanese Patent Application Publication No. JP2007336725A discloses a first technique of securing the vibration resistance of a stator. Specifically, according to the first technique, a resin adhesive, such as varnish, is filled in the slots of the stator core, thereby fixing the electric wires, which form the stator coil, in the slots. In addition, this patent document also discloses that each of the electric wires forming the stator coil has an insulating coat (or insulating layer) formed on its outer surface. The insulating coat is made of enamel such as an amide-imide (AI) resin or a polyimide (PI) resin.

Japanese Patent Application Publication No. JP2009095167A discloses a second technique of securing the vibration resistance of a stator. Specifically, according to the second technique, a resin adhesive, such as varnish, is applied to a pair of coil end parts of the stator coil which protrude outside the slots respectively from opposite axial end faces of the stator core.

However, during operation of the rotating electric machine, electric current flows in the electric wires forming the stator coil, causing the temperature of the electric wires to be increased due to the electrical resistances thereof. In particular, when the rotating electric machine is used in a motor vehicle where a number of heat-generating machines and devices are installed, the rotating electric machine is subject to a high ambient temperature. Therefore, it is easy for the temperature of the electric wires forming the stator coil to become high. Moreover, the adhesion strength between the resin adhesive and the insulating coats of the electric wires is high. Consequently, when the resin adhesive is cracked by a shock or thermal stress imposed thereon, the insulating coats of the electric wires may also be cracked along with the resin adhesive, resulting in puncture or breakdown of the insulating coats.

SUMMARY

According to exemplary embodiments, there is provided a first stator for a rotating electric machine. The first stator includes an annular stator core, a stator coil and a resin adhesive. The stator core has a plurality of slots formed therein. The slots are spaced from one another in a circumferential direction of the stator core. The stator coil is comprised of a plurality of electric wires that are mounted on the stator core so as to be received in the slots of the stator core. The resin adhesive is filled in the slots of the stator core to fix the electric wires in the slots. Moreover, each of the electric wires includes an electric conductor and an insulating coat that covers an outer surface of the electric conductor. The insulating coat is two-layer structured to include an inner coat and an outer coat that is formed outside the inner coat. The adhesion strength of the outer coat to the resin adhesive is lower than the adhesion strength of the inner coat to the resin adhesive.

With the above configuration, even if cracks are generated in the resin adhesive filled in the slots of the stator core due to a shock involved in operation of the rotating electric machine or a change in ambient temperature, the cracking stress will act in such a manner as to break up the adhesion between the resin adhesive and the outer coats of the electric wires, thus preventing the cracks from progressing to the outer coats. That is, it will be possible to prevent the outer coats from being cracked along with the resin adhesive. As a result, it will be possible to prevent the cracks from reaching the electric conductors of the electric wires, thereby reliably preventing puncture of the insulating coats of the electric wires.

According to the exemplary embodiments, there is also provided a second stator for a rotating electric machine. The second stator includes an annular stator core, a stator coil and a resin adhesive. The stator core has a plurality of slots formed therein. The slots are spaced from one another in a circumferential direction of the stator core. The stator coil is comprised of a plurality of electric wires mounted on the stator core. The electric wires are partially received in the slots of the stator core so that the stator coil has a pair of coil end parts protruding outside the slots respectively from opposite axial end faces of the stator core. The resin adhesive is applied to the coil end parts of the stator coil to fix the electric wires at the coil end parts. Moreover, each of the electric wires includes an electric conductor and an insulating coat that covers an outer surface of the electric conductor. The insulating coat is two-layer structured to include an inner coat and an outer coat that is formed outside the inner coat. The adhesion strength of the outer coat to the resin adhesive is lower than the adhesion strength of the inner coat to the resin adhesive.

With the above configuration, even if cracks are generated in the resin adhesive applied to the coil end parts of the stator coil due to a shock involved in operation of the rotating electric machine or a change in ambient temperature, the cracking stress will act in such a manner as to break up the adhesion between the resin adhesive and the outer coats of the electric wires, thus preventing the cracks from progressing to the outer coats. That is, it will be possible to prevent the outer coats from being cracked along with the resin adhesive. As a result, it will be possible to prevent the cracks from reaching the electric conductors of the electric wires, thereby reliably preventing puncture of the insulating coats of the electric wires.

In the above first and second stators, each of the electric wires may be formed of a predetermined number of electric wire segments. Each of the electric wire segments is substantially U-shaped to have a pair of straight portions extending parallel to each other and a turn portion connecting ends of the straight portions on the same side. The straight portions are respectively inserted in a corresponding pair of the slots of the stator core, with the turn portion located outside the corresponding slots on a first axial side of the stator core and free end parts of the straight portions respectively protruding axially outside the corresponding slots on a second axial side of the stator core. The free end parts of the straight portions are bent to form a pair of oblique portions of the electric wire segment; the oblique portions extend toward opposite circumferential sides and obliquely at a predetermined angle with respect to an axial end face of the stator core. Corresponding ends of the oblique portions of the electric wire segments are joined and thus electrically connected to one another. All the turn portions of the electric wire segments together constitute one of the coil end parts of the stator coil on the first axial side of the stator core. All the oblique portions of the electric wire segments together constitute the other coil end part on the second axial side of the stator core. Moreover, in this case, it is preferable that each of the turn portions of the electric wire segments is stair-shaped to include a plurality of step portions that extend parallel to the axial end face of the stator core and are spaced from one another in an axial direction of the stator core.

Otherwise, each of the electric wires may be formed of a continuous electric wire which includes a plurality of in-slot portions and a plurality of turn portions. The in-slot portions extend parallel to each other and are respectively received in corresponding ones of the slots of the stator core. The turn portions connect adjacent in-slot portions alternately on opposite axial sides of the stator core. All the turn portions of the electric wires located on one of the opposite axial sides of the stator core together constitute one of the coil end parts of the stator coil. All the turn portions of the electric wires located on the other axial side of the stator core together constitute the other coil end part of the stator coil. Moreover, in this case, it is preferable that each of the turn portions of the electric wires is stair-shaped to include a plurality of step portions that extend parallel to the axial end face of the stator core and are spaced from one another in an axial direction of the stator core.

The above first and second stators may be employed in a rotating electric machine which further includes: a rotor that is rotatably disposed in radial opposition to the first or the second stator; and a coolant supplier configured to supply a liquid coolant to the first or the second stator. Moreover, in this case, it is preferable that the coolant supplier is configured to supply the liquid coolant to the coil end parts of the stator coil which protrude outside the slots respectively from opposite axial end faces of the stator core.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
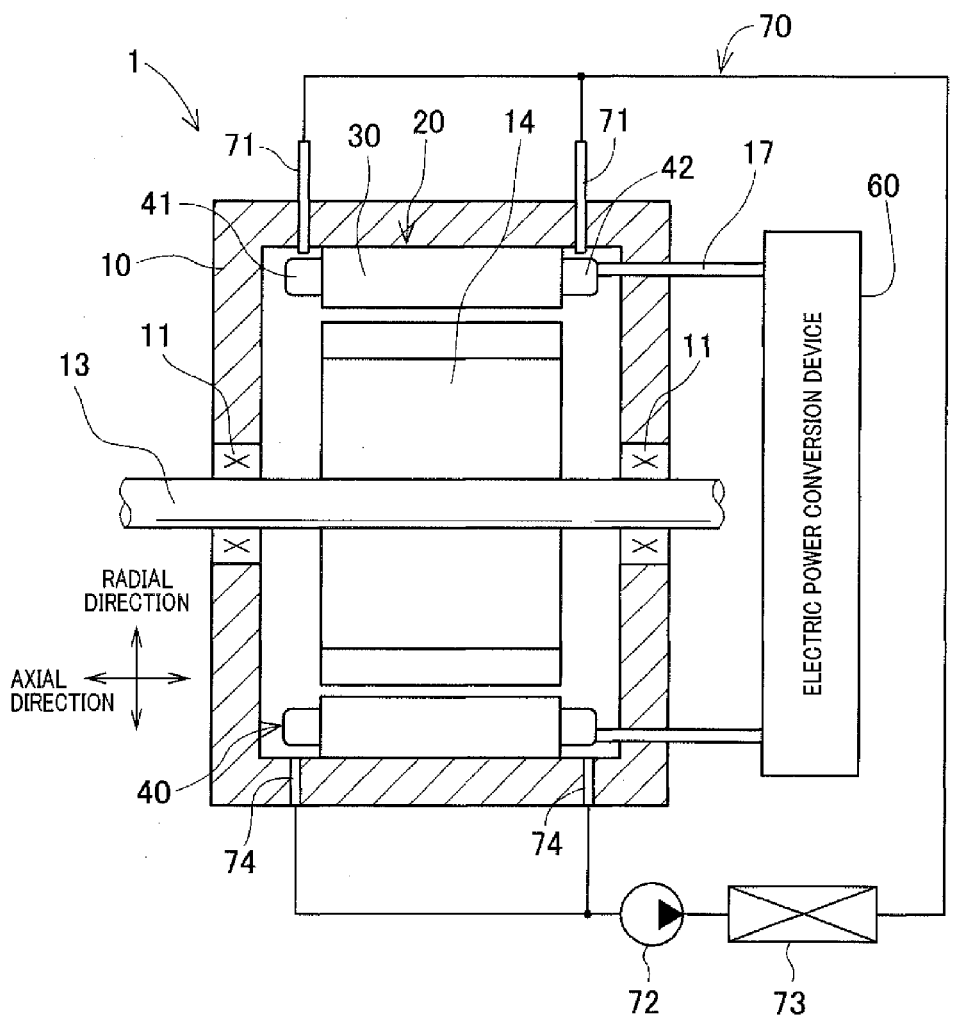
FIG. 1 is a schematic cross-sectional view of a rotating electric machine according to a first embodiment.

Exemplary embodiments will be described hereinafter with reference to FIGS. 1-16. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a rotating electric machine 1 according to the first embodiment.

In the present embodiment, the rotating electric machine 1 is configured as an inner rotor-type motor-generator for use in, for example, a motor vehicle. The motor-generator can selectively function either as an electric motor or as an electric generator.

As shown in FIG. 1, the rotating electric machine 1 includes a housing 10, a rotating shaft 13, a rotor 14, a stator 20 that includes an annular stator core 30 and a three-phase stator coil 40, and a coolant supplier 70. Moreover, the rotating electric machine 1 is electrically connected with an electric power conversion device 60 via input/output lines 17. The housing 10 of the rotating electric machine 1 and a case member (not shown in the figures) of the electric power conversion device 60 may be either integrally formed into one piece or separately formed and then fixed together by fixing means. The fixing means may be implemented by, for example, a bolt/nut combination, a male thread/female thread combination, a through-hole/cotter pin combination, or a joint formed by welding or crimping. It is also possible to fix the housing 10 of the rotating electric machine 1 and the case member of the electric power conversion device 60 by suitably combining at least two of the aforementioned fixing means. In addition, the input/output lines 17 may be formed by extending electric conductor segments 50 which constitute the stator coil 40 and will be described in detail later.

The rotating shaft 13 is rotatably supported by the housing 10 via bearings 11. The rotating shaft 13 may be integrally formed with the rotor 14 into one piece or separately formed from the rotor 14 and then fixed to a central portion of the rotor 14 by fixing means. In either case, the rotating shaft 13 and the rotor 14 rotate together with each other.

Figure 2:
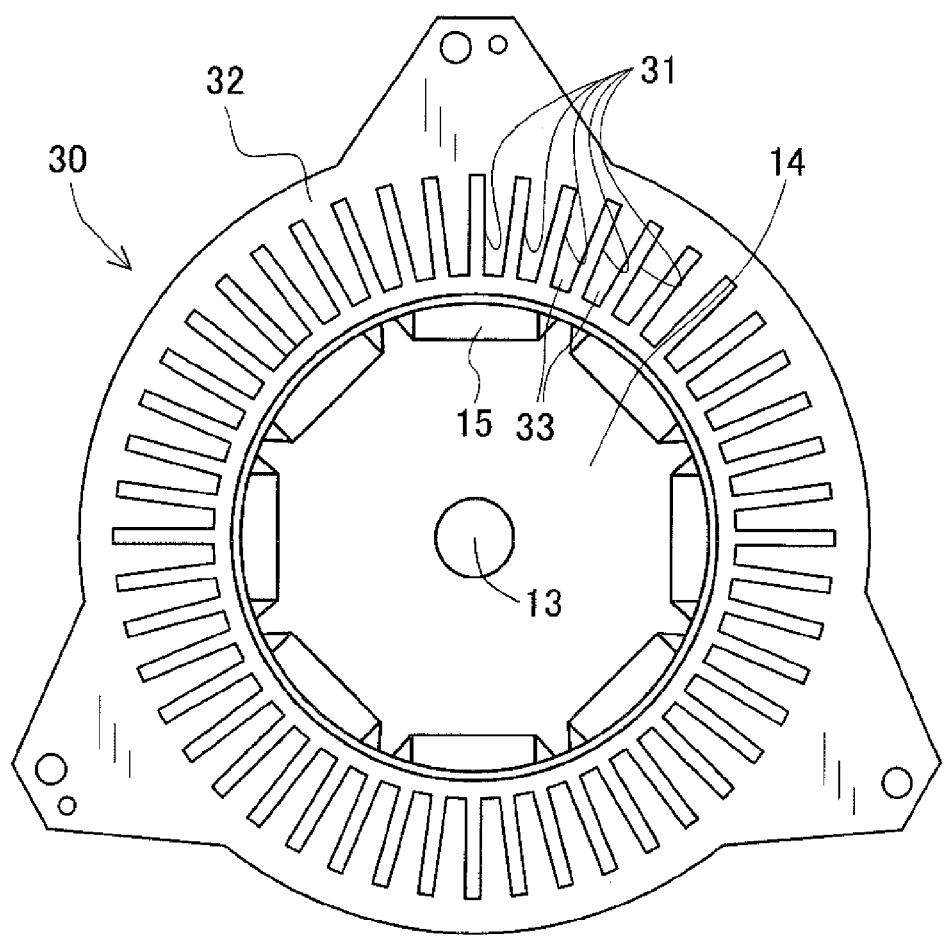
FIG. 2 is an axial view of a stator core and a rotor which are included in the rotating electric machine according to the first embodiment.

The rotor 14 has, as shown in FIG. 2, a plurality of permanent magnets 15 embedded in its radially outer surface at predetermined positions. The permanent magnets 15 form a plurality of magnetic poles the polarities of which alternate between north and south in the circumferential direction of the rotor 14. The number of the magnetic poles can be suitably set according to the design specification of the rotating electric machine 1. In the present embodiment, the number of the magnetic poles is set to be equal to, for example, eight (i.e., four north poles and four south poles).

Figure 3:
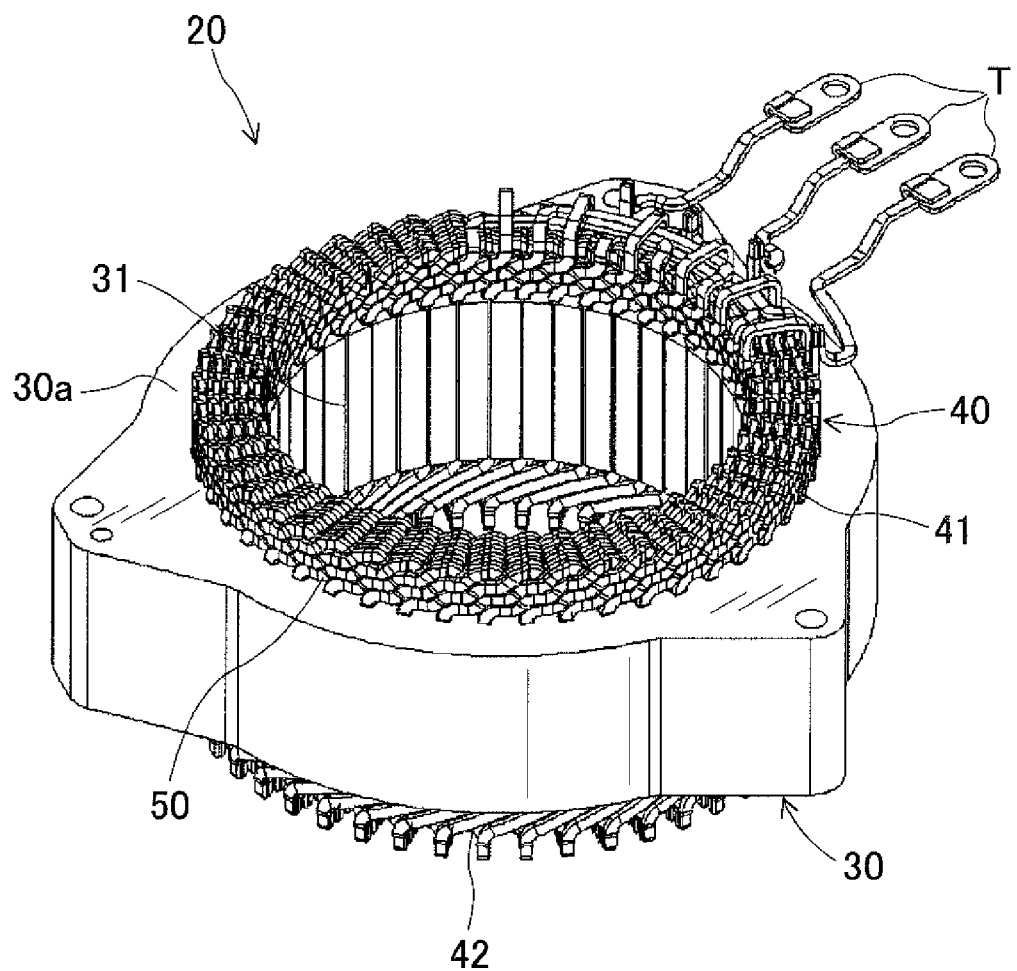
FIG. 3 is a perspective view of a stator according to the first embodiment.

Referring now to FIG. 3, the stator 20 has the annular stator core 30 arranged in radial opposition to the radially outer periphery of the rotor 14 and the three-phase (U, V, W) stator coil 40 mounted on the stator core 30. The stator 20 is fixed by fixing means to the housing 10 so that the radially inner surface of the stator core 30 faces the radially outer surface of the rotor 14 through a predetermined air gap formed therebetween.

The stator core 30 is formed by laminating a plurality of annular magnetic steel sheets in the axial direction. As shown in FIG. 2, the stator core 30 has an annular back core portion 32 on the radially outer side and a plurality of teeth 33 that protrude from the back core portion 32 radially inward and are circumferentially spaced from one another at predetermined intervals. Between each circumferentially-adjacent pair of the teeth 33, there is formed a slot 31 that radially extends and opens on the radially inner surface of the stator core 30.

In the present embodiment, the number of the slots 31 of the stator core 30 is set as follows: $Sn=S \times Mn \times P=2 \times 8 \times 3=48$, where Sn represents the number of the slots 31, S represents the slot multiplier number (a positive integer) and is to set to 2, Mn represents the number of the magnetic poles of the rotor 14 and is set to 8, and P represents the number of phases of the stator coil 40 and is set to 3.

Figure 4:
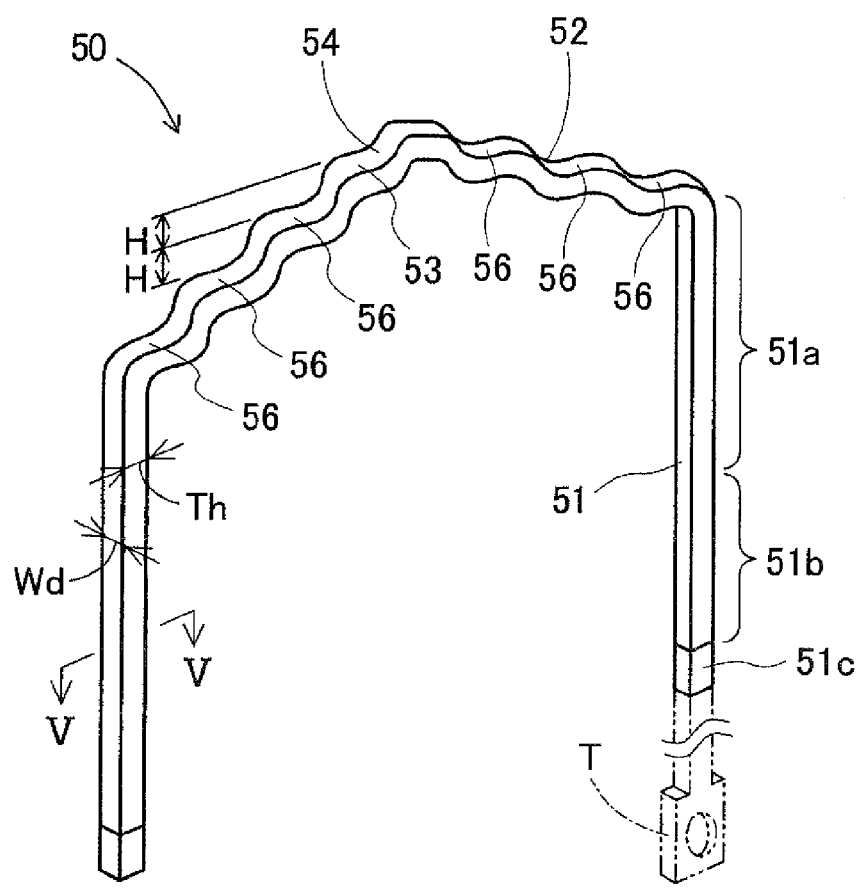
FIG. 4 is a perspective view of one of electric conductor segments that together form a stator coil of the stator according to the first embodiment.

Moreover, in the present embodiment, the stator coil 40 is formed by first mounting a plurality of substantially U-shaped electric wire segments 50 to the stator core 30 and then connecting the electric wire segments 50 in a predetermined pattern. As shown in FIG. 4, each of the electric wire segments 50 has a pair of straight portions 51 extending parallel to each other and a turn portion 52 connecting ends of the straight portions 51 on the same side. In addition, some of the electric wire segments 50 have a terminal T formed at an end 51*c* thereof, as indicated with a two-dot chain line in FIG. 4.

The turn portion 52 is stair-shaped to include a plurality of step portions 53 and 56. In the finally obtained stator 20, the step portions 53 and 56 of the turn portion 52 extend parallel to an axial end face 30*a* of the stator core 30 and are spaced from one another in the axial direction of the stator core 30. The height H of each step of the turn portion 52 (i.e., the distance between each adjacent pair of the step portions 53 and 56) may be set to any suitable value. In the present embodiment, the height H is set to be substantially equal to the thickness Th of the electric wire segments 50. Consequently, it is possible to easily stack the turn portions 52 of the electric wire segments 50 on one another. Moreover, the number of steps of each turn portion 52 may be suitably set according to, for example, the interval between the straight portions 51 of the electric wire segment 50. In addition, part or the whole of the step portions 53 and 56 may be slightly bent by 5-15 degrees so as to avoid contact between the electric wire segments 50.

In the apex step portion 53 which is located at the center of the turn portion 52, there is formed a crank portion 54 that is bent into a crank shape so as to shift ends of the turn portion 52 respectively toward opposite radial sides. That is, the crank portion 54 is formed in the apex step portion 53 which has the maximum protruding height from the axial end face 30*a* of the stator core 30 in the turn portion 52. The amount of radial shift realized by the crank portion 54 may be set to any suitable value. In the present embodiment, the amount of radial shift is set to be substantially equal to the width Wd of the electric wire segments 50. Consequently, it is possible to easily radially offset the electric wire segments 50 from each other. In addition, it should be noted that the electric wire segments 50 may be modified to have only the crank portion 54 without being stair-shaped.

Figure 6:
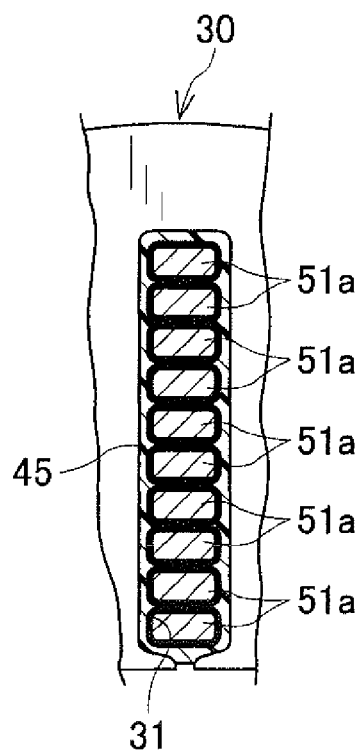
FIG. 6 is a partially cross-sectional view of part of the stator according to the first embodiment.

For each of the electric wire segments 50, the pair of straight portions 51 of the electric wire segment 50 are inserted, from a first axial side of the stator core 30, respectively into a corresponding pair of the slots 31 of the stator core 30 which are circumferentially apart from each other by one magnetic pole pitch. In this way, in each of the slots 31 of the stator core 30, there are sequentially inserted and stacked a predetermined number of the straight portions 51 of the electric wire segments 50. Moreover, the predetermined number of the straight portions 51 of the electric wire segments 50 which are stacked in the same slot 31 of the stator core 30 belong to the same phase (i.e., a same one of the U, V and W phases). In the present embodiment, as shown in FIG. 6, in each of the slots 31 of the stator core 30, there are arranged a total of ten straight portions 51 (more specifically, the in-slot portions Ma shown in FIG. 4) in radial alignment with each other.

Then, free end parts of the straight portions 51, which respectively protrude from the corresponding slots 31 of the stator core 30 on a second axial side of the stator core 30, are bent so as to extend toward opposite circumferential sides and obliquely at a predetermined angle with respect to the axial end face 30*a* of the stator core 30. Consequently, the free end parts of the straight portions 51 are respectively transformed into a pair of oblique portions 51*b* of the electric wire segment 50 (see FIG. 4). The oblique portions 51*b* have a circumferential length corresponding to substantially half a magnetic pole pitch.

Thereafter, on the second axial side of the stator core 30, each corresponding pair of the ends 51*c* of the oblique portions 51*b* of the electric wire segments 50 and each corresponding pair of the ends Mc of the oblique portions 51*b* and the terminals T are joined, thereby electrically connecting the electric wire segments 50 in the predetermined pattern. More specifically, the electric wire segments 50 are electrically connected to form a Y-connection, a Δ-connection or a Y-Δ-connection. As a result, the stator coil 40 is obtained which includes U-phase, V-phase and W-phase windings (or U-phase, V-phase and W-phase electric wires); each of the U-phase, V-phase and W-phase windings is constituted by a predetermined number of the electric wire segments 50 mounted on the stator core 30.

In addition, each corresponding pair of the ends 51c of the oblique portions 51b of the electric wire segments 50 and each corresponding pair of the ends 51c of the oblique portions 51b and the terminals T may be joined by soldering or welding. Moreover, the welding may be fusion welding (e.g., gas welding, arc welding, electroslag welding, electron beam welding or laser beam welding) or pressure welding (e.g., resistance welding or forge welding).

As above, the stator coil 40 is mounted on the stator core 30 to have first and second coil end parts 41 and 42 respectively protruding from the axial end faces 30a of the stator core 30. The first coil part 41 is constituted by all the turn portions 52 of the electric wire segments 50 which are located outside the slots 31 of the stator core 30 on the first axial side (i.e., the upper side in FIG. 3) of the stator core 30. The second coil end part 42 is constituted by all the oblique portions 51b of the electric wire segments 50 which are located outside the slots 31 of the stator core 30 on the second axial side (i.e., the lower side in FIG. 3) of the stator core 30. Each of the first and second coil end parts 41 and 42 of the stator coil 40 is substantially annular in shape.

Moreover, the stator coil 40 mounted on the stator core 30 is further fixed to the stator core 30 by varnish (a resin adhesive) 45. More specifically, as shown in FIG. 6, for each of the slots 31 of the stator core 30, the ten in-slot portions 51a of the electric wire segments 50 received in the slot 31 are fixed to the wall surface of the slot 31 by the varnish 45 which is filled and solidified in the slot 31.

Figure 7:
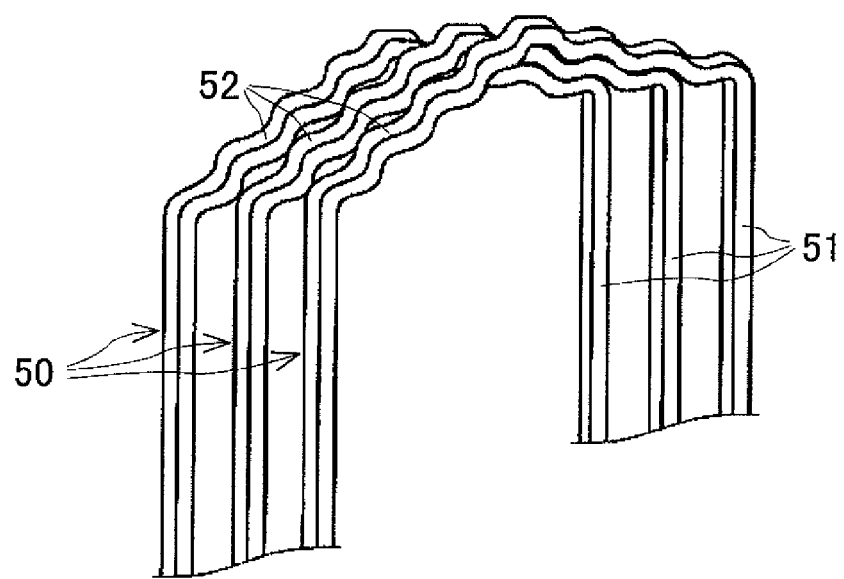
FIG. 7 is a perspective view showing part of a first coil end part of the stator coil according to the first embodiment.
Figure 8:
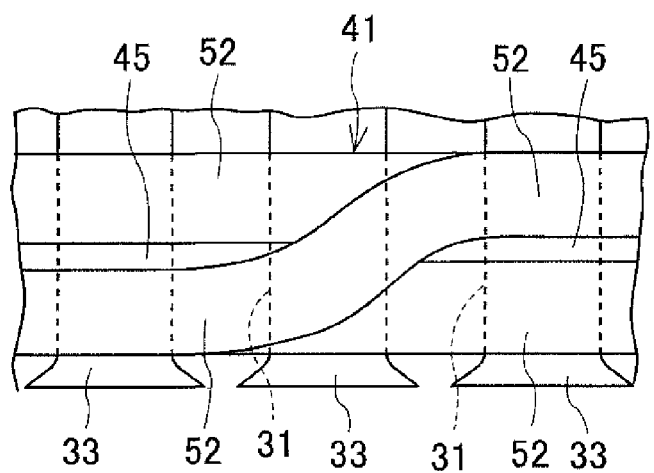
FIG. 8 is a plan view of part of the first coil end part of the stator coil according to the first embodiment.

Furthermore, in the present embodiment, to improve the vibration resistance of the stator coil 40, the varnish 45 is also applied to the first and second coil end parts 41 and 42 of the stator coil 40. More specifically, as shown in FIGS. 7 and 8, at the first coil end part 41, the varnish 45 is filled and solidified in the gaps formed between adjacent turn portions 52 of the electric wire segments 50, thereby improving the strength and vibration resistance of the first coil end part 41. Similarly, though not shown in the figures, at the second coil end part 42, the varnish 45 is filled and solidified in the gaps formed between adjacent oblique portions 51b of the electric wire segments 50, thereby improving the strength and vibration resistance of the second coil end part 42.

In addition, the varnish 45 may be implemented by, for example, a resin selected from unsaturated polyester resins, alkyd resins and epoxy resins.

Referring back to FIG. 5, in the present embodiment, each of the electric wire segments 50 forming the stator coil 40 includes an electric conductor 58 and an insulating coat (or insulating layer) 59 that covers the outer surface of the electric conductor 58. The electric conductor 58 is made, for example, of copper and has a substantially rectangular cross section. The insulating coat 59 is two-layer structured to include an inner coat 59a and an outer coat 59b that is formed outside the inner coat 59a. The inner coat 59a may be formed of, for example, a polyimide (PI) or polyamide-imide (PAT) resin. On the other hand, the outer coat 59b may be formed of, for example, a polyphenylene sulfide (PPS) or polyetherether ketone (PEEK) resin.

Furthermore, in the present embodiment, the adhesion strength of the outer coat 59b to the varnish 45 is set to be lower than the adhesion strength of the inner coat 59a to the varnish 45. More specifically, the materials of the varnish 45 and the inner and outer coats 59a and 59b are selected so that the adhesion strength between the material of the outer coat 59b and the material of the varnish 45 is lower than the adhesion strength between the material of the inner coat 59a and the material of the varnish 45. Here, the term "adhesion strength" between two members denotes the tensile strength between them when they are adhered to each other.

For example, the adhesion strength of the inner coat 59a to the varnish 45 is in the range of 8 to 18 MPa when the inner coat 59a and the varnish 45 are respectively formed of a PAI resin and an epoxy resin. On the other hand, the adhesion strength of the outer coat 59b to the varnish 45 is in the range of 4 to 8 MPa when the outer coat 59b and the varnish 45 are respectively formed of a PPS resin and an epoxy resin, and in the range of 3 to 5 MPa when the outer coat 59b and the varnish 45 are respectively formed a PEEK resin and an epoxy resin.

That is, in the present embodiment, between the inner coat 59a and the varnish 45, there is interposed the outer coat 59b that has a lower adhesion strength than the inner coat 59a with respect to the varnish 45. Consequently, when cracks are generated in the varnish 45 due to a shock involved in operation of the rotating electric machine 1 or a change in ambient temperature, the cracks are prevented from progressing to the outer coat 59b.

In addition, as mentioned previously, a PEEK resin has a lower adhesion strength than a PPS resin with respect to the varnish 45. Therefore, in terms of reliably setting the adhesion strength of the outer coat 59b to the varnish 45 to be lower than the adhesion strength of the inner coat 59a to the varnish 45, it is preferable to use a PEEK resin as the material of the outer coat 59b.

Moreover, in the present embodiment, the thickness of the insulating coat 59 (i.e., the sum of thicknesses of the inner and outer coats 59a and 59b) is set to be in the range of 100 to 200 μm. Consequently, with such a large thickness of the two-layer structured insulating coat 59, it is possible to reliably insulate the electric wire segments 50 from one another without interposing insulating paper therebetween.

Next, the coolant supplier 70 for supplying a liquid coolant to the stator 20 will be described.

In the present embodiment, as shown in FIG. 1, the coolant supplier 70 includes: a pair of nozzles 71 for respectively dripping a liquid coolant (not shown in the figures), such as ATF (Automatic Transmission Fluid), onto the first and second coil end parts 41 and 42 of the stator coil 40; a pump 72 for delivering the liquid coolant to the nozzles 71; and a heat dissipater (or radiator) 73 for dissipating heat of the recovered liquid coolant. The nozzles 71, the pump 72 and the heat dissipater 73 are fluidically connected with one another via liquid coolant pipes, thereby forming a liquid coolant circulation circuit.

More specifically, the liquid coolant discharged from the pump 72 is delivered, via the heat dissipater 73, to the nozzles 71. Then, the liquid coolant is dripped from the nozzles 71 onto the first and second coil end parts 41 and 42 of the stator coil 40. The dripped liquid coolant then flows downward through the stator coil 40 while cooling the stator 20. Thereafter, the liquid coolant is drained out of the housing 10 via a drain outlet 74 formed in a bottom wall of the housing 10, and returned (or recovered) to the pump 72. Then, the liquid coolant is again discharged from the pump 72 to circulate in the liquid coolant circulation circuit.

The above-described rotating electric machine 1 according to the present embodiment operates as follows.

Referring to FIG. 1, in the present embodiment, the rotating electric machine 1 selectively operates in either a motor mode or a generator mode.

In the motor mode, a drive current, which results from electric power conversion by the electric power conversion device 60, is supplied from the electric power conversion device 60 to the stator coil 40, thereby energizing the stator 20. Upon energization of the stator 20, rotating torque is generated, causing the rotor 14 to rotate together with the rotating shaft 13. The generated torque is then outputted, via the rotor 14 and the rotating shaft 13, to rotating objects such as vehicle wheels and a propeller.

In addition, between the rotating shaft 13 and the rotating objects, there may be interposed a power transmission mechanism which includes at least one of, for example, a shaft, a cam, a rack and pinion and a gear pair.

In the generator mode, no drive current is supplied from the electric power conversion device 60 to the stator coil 40. Instead, rotating torque is transmitted from the rotating objects to the rotating shaft 13, causing the rotor 14 to rotate together with the rotating shaft 13. With rotation of the rotor 14, counterelectromotive force (or regenerative electric power) is generated in the stator coil 40. The generated counterelectromotive force is then outputted, via the electric power conversion device 40, to charge a battery.

During operation of the rotating electric machine 1 in either the motor mode or the generator mode, electric current flows in the stator coil 40, causing the stator coil 40 to generate heat. In the present embodiment, the coolant supplier 70 starts its operation at the same time as the start of operation of the rotating electric machine 1. Consequently, the liquid coolant is dripped from the nozzles 71 onto the first and second coil end parts 41 and 42 of the stator coil 40. The dripped liquid coolant then flows downward along the surfaces of the stator coil 40 and the stator core 30. As a result, the stator 20 can be effectively cooled by the liquid coolant.

Figure 9:
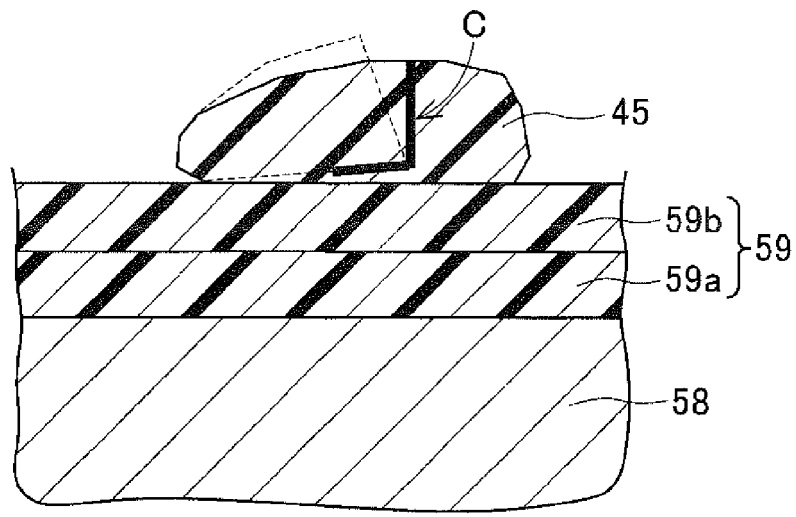
FIG. 9 is a schematic view illustrating the progress of cracks generated in varnish in the stator according to the first embodiment.

Moreover, in the stator 20, cracks may be generated, due to a shock involved in operation of the rotating electric machine 1 or a change in ambient temperature, in the varnish 45 filled in the slots 31 of the stator core 30 and/or in the varnish 45 applied to the first and second coil end parts 41 and 42 of the stator coil 40. However, in the present embodiment, for each of the insulating coats 59 of the electric wire segments 50 forming the stator coil 40, the adhesion strength of the outer coat 59b of the insulating coat 59 to the varnish 45 is set to be lower than the adhesion strength of the inner coat 59a of the insulating coat 59 to the varnish 45. Consequently, as shown in FIG. 9, even if cracks C are generated in the varnish 45, it will be difficult for a severe stress change to occur at the interface between the varnish 45 and the outer coat 59b. Therefore, the cracking stress will act in such a manner as to break up the adhesion between the varnish 45 and the outer coat 59b, thus preventing the cracks C from progressing to the outer coat 59b. That is, it will be possible to prevent the outer coat 59b from being cracked along with the varnish 45. As a result, it will be possible to prevent the cracks C from reaching the electric conductor 58, thereby reliably preventing puncture of the insulating coat 59.

Figure 10:
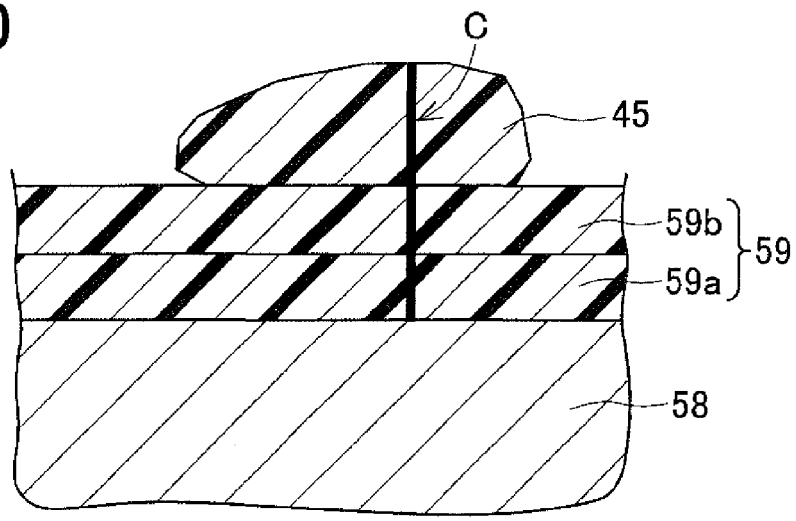
FIG. 10 is a schematic view illustrating the progress of cracks generated in varnish in a stator according to a comparative example.

In contrast, if the adhesion strength of the outer coat 59b to the varnish 45 was set to be higher than the adhesion strength of the inner coat 59a to the varnish 45, it would be easy for a severe stress change to occur at the interface between the varnish 45 and the outer coat 59b. Consequently, as shown in FIG. 10, the cracks C generated in the varnish 45 would progress to the outer coat 59b and the inner coat 59a of the insulating coat 59, reaching the electric conductor 58. As a result, puncture of the insulting coat 59 would occur.

According to the present embodiment, it is possible to achieve the following advantageous effects.

In the present embodiment, the stator 20 includes the annular stator core 30 and the three-phase stator coil 40. The stator core 30 has the slots 31 formed therein; the slots 31 are spaced from one another in the circumferential direction of the stator core 30. The stator coil 40 is comprised of the electric wire segments 50 that are mounted on the stator core 30 so as to be received in the slots 31 of the stator core 30. The varnish (i.e., resin adhesive) 45 is filled in the slots 31 of the stator core 30 to fix the electric wire segments 50 in the slots 31. Each of the electric wire segments 50 includes the electric conductor 58 and the insulating coat 59 that covers the outer surface of the electric conductor 58. The insulating coat 59 is two-layer structured to include the inner coat 59a and the outer coat 59b that is formed outside the inner coat 59a. The adhesion strength of the outer coat 59b to the varnish 45 is lower than the adhesion strength of the inner coat 59a to the varnish 45.

Consequently, when cracks are generated in the varnish 45 filled in the slots 31 of the stator core 30 due to a shock involved in operation of the rotating electric machine 1 or a change in ambient temperature, it is possible to prevent the cracks from progressing to the outer coats 59b of the insulating coats 59 of the electric wire segments 50. As a result, it is possible to prevent the cracks from reaching the electric conductors 58 of the electric wire segments 50, thereby reliably preventing puncture of the insulating coats 59 of the electric wire segments 50.

Moreover, in the present embodiment, the electric wire segments 50 forming the stator coil 40 are partially received in the slots 31 of the stator core 30 so that the stator coil 40 has the first and second coil end parts 41 and 42 protruding outside the slots 31 respectively from opposite axial end faces 30a of the stator core 30. The varnish 45 is also applied to the first and second coil end parts 41 and 42 of the stator coil 40.

Consequently, the first and second coil end parts 41 and 42 of the stator coil 40 are also fixed by the varnish 45, thereby improving the vibration resistance of the stator coil 40. Moreover, when cracks are generated in the varnish 45 applied to the first and second coil end parts 41 and 42 due to a shock involved in operation of the rotating electric machine 1 or a change in ambient temperature, it is possible to prevent the cracks from progressing to the outer coats 59b of the insulating coats 59 of the electric wire segments 50. As a result, it is possible to prevent the cracks from reaching the electric conductors 58 of the electric wire segments 50, thereby reliably preventing puncture of the insulating coats 59 of the electric wire segments 50.

In the present embodiment, the three-phase stator coil 40 includes the U-phase, V-phase and W-phase windings, each of which can be regarded as an electric wire that is formed of a predetermined number of the electric wire segments 50. Moreover, each of the electric wire segments 50 is substantially U-shaped to have the pair of straight portions 51 extending parallel to each other and the turn portion 52 connecting ends of the straight portions 51 on the same side. The straight portions 51 are respectively inserted in the corresponding pair of the slots 31 of the stator core 30, with the turn portion 52 located outside the corresponding slots 31 on the first axial side of the stator core 30 and the free end parts of the straight portions 51 respectively protruding axially outside the corresponding slots 31 on the second axial side of the stator core 30. The free end parts of the straight portions 51 are bent to form the pair of oblique portions 51b of the electric wire segment 50. The oblique portions 51b extend toward opposite circumferential sides and obliquely at the predetermined angle with respect to the axial end face 30a of the stator core 30. Corresponding ends 51c of the oblique portions 51b of the electric wire segments 50 are joined and thus electrically connected to one another. All the turn portions 52 of the electric wire segments 50 together constitute the first coil end part 41 of the stator coil 40 on the first axial side of the stator core 30. All the oblique portions 51b of the electric wire segments 50 together constitute the second coil end part 42 of the stator coil 40 on the second axial side of the stator core 30.

With the above configuration, when the free end parts of the straight portions 51 of the electric wire segments 50 are bent to form the oblique portions 51b, three-dimensional forces are applied to the straight portions 51. Consequently, at those parts of the straight portions 51 which receive the three-dimensional forces, it is particularly easy for puncture of the insulating coats 59 to occur due to concentration of thermal stress. However, in the present embodiment, by setting the adhesion strengths of the inner and outer coats 59a and 59b of the insulating coats 59 to the varnish 45 as described above, it is still possible to reliably prevent puncture of the insulating coats 59 from occurring at the second coil end part 42 of the stator coil 40.

In the present embodiment, each of the turn portions 52 of the electric wire segments 50 is stair-shaped to include the step portions 53 and 56 that extend parallel to the axial end face 30a of the stator core 30 and are spaced from one another in the axial direction of the stator core 30.

With the above configuration, at the first coil end part 41 of the stator coil 40, it is possible to densely arrange the turn portions 52 of the electric wire segments 50, thereby reducing the axial length (or the protruding height from the axial end face 30a of the stator core 30) of the first coil end part 41.

In the present embodiment, the rotating electric machine 1 includes the stator 20, the rotor 14 that is rotatably disposed in radial opposition to the stator 20, and the coolant supplier 70 configured to supply the liquid coolant to the stator 20. More specifically, the coolant supplier 70 is configured to supply the liquid coolant to the first and second coil end parts 41 and 42 of the stator coil 40.

With the above configuration; the liquid coolant, whose temperature is about 100° C., is directly supplied to the first and second coil end parts 41 and 42 of the stator coil 40. On the other hand, the ambient temperature of the stator 20 during operation of the rotating electric machine 1 is generally about 180° C. That is, the stator coil 40 is subject to a severe temperature change which may cause cracks to occur in the varnish 45. However, in the present embodiment, by setting the adhesion strengths of the inner and outer coats 59a and 59b of the insulating coats 59 to the varnish 45 as described above, it is still possible to reliably prevent puncture of the insulating coats 59 from occurring in the stator coil 40.

Second Embodiment

A stator 120 according to the second embodiment will be described with reference to FIGS. 11-16.

The stator 120 according to the present embodiment is also designed to be used in the rotating electric machine 1 (see FIG. 1) described in the first embodiment.

Figure 11:
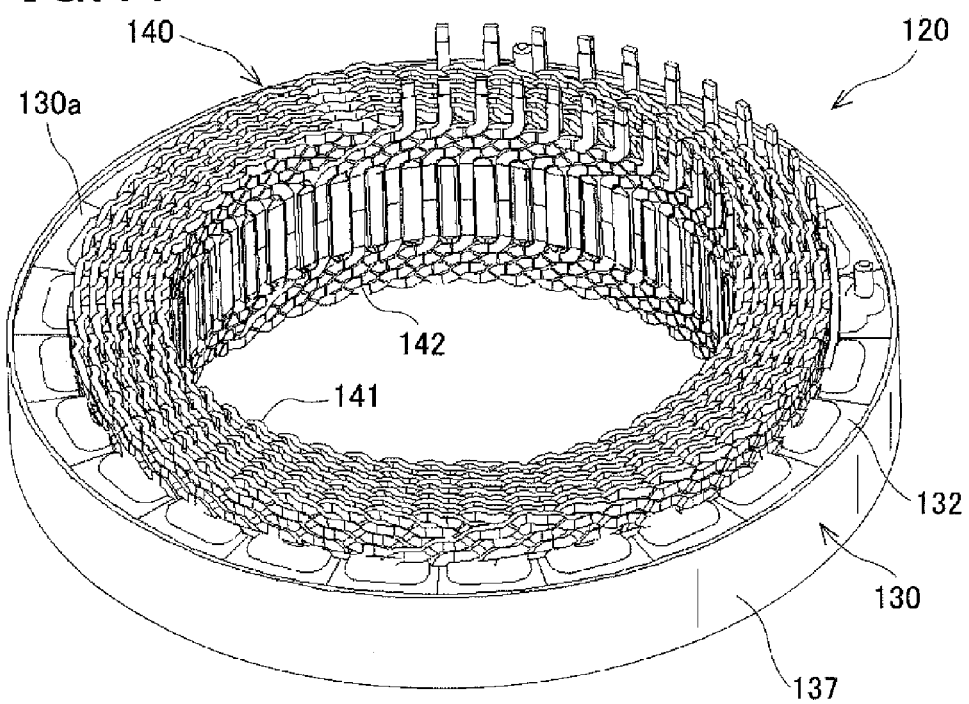
FIG. 11 is a perspective view of a stator according to a second embodiment.

As shown in FIG. 11, the stator 120 includes an annular stator core 130, which is obtained by assembling a plurality of stator core segments 132 divided in its circumferential direction, and a stator coil 140 that is comprised of a plurality of continuous electric wires 150 mounted on the stator core 130.

Figure 12:
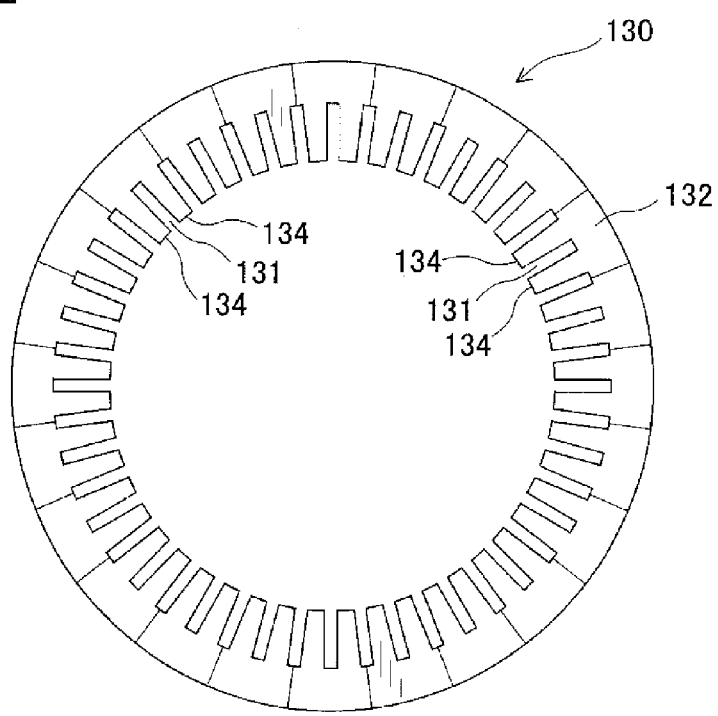
FIG. 12 is an axial end view of a stator core of the stator according to the second embodiment.

Specifically, as shown in FIG. 12, the stator core 130 is comprised of the plurality (e.g., 24 in the present embodiment) of stator core segments 132 that are arranged in the circumferential direction of the stator core 130 so as to adjoin one another in the circumferential direction. On the radially outer surface of the stator core 130 (or the radially outer surfaces of the stator core segments 132), there is shrink-fitted an outer cylinder 137 (see FIG. 11) to keep the annular shape of the stator core 130.

The stator core 130 has a plurality of slots 131 that are formed in the radially inner surface of the stator core 130 and spaced in the circumferential direction of the stator core 130 at predetermined intervals. For each of the slots 131, the depth direction of the slot 131 is coincident with a radial direction of the stator core 130. In addition, as in the first embodiment, the number Sn of the slots 131 formed in the stator core 130 is set as follows: $Sn=S \times Mn \times P=2 \times 8 \times 3=48$.

Figure 13:
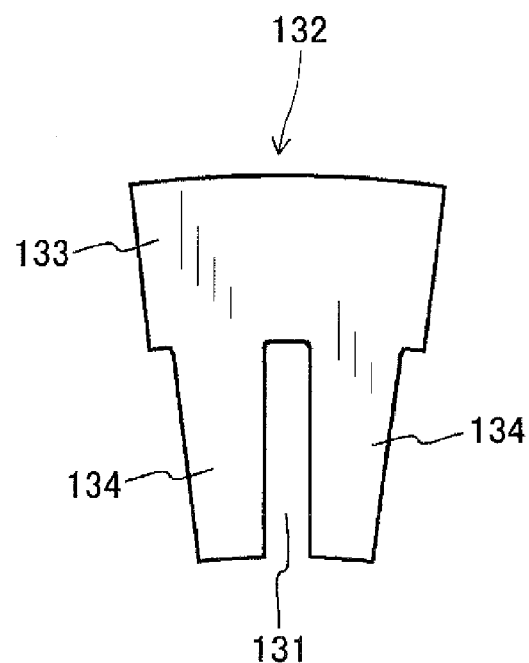
FIG. 13 is a plan view of one of stator core segments that together constitute the stator core according to the second embodiment.

As shown in FIGS. 12 and 13, each of the stator core segments 132 defines therein one of the slots 131. Moreover, each circumferentially-adjoining pair of the stator core segments 132 together defines a further one of the slots 131 therebetween. Each of the stator core segments 132 also has two teeth 134, which radially extend to form the one of the slots 131 therebetween, and a back core portion 133 that is positioned radially outside the teeth 134 to connect them.

In the present embodiment, each of the stator core segments 132 is formed by laminating a plurality of magnetic steel sheets in the axial direction of the stator core 130. The magnetic steel sheets are formed by, for example, blanking and fixed together by, for example, staking.

The stator coil 140 is comprised of the plurality (e.g., 12 in the present embodiment) of wave-shaped continuous electric wires 150 to have, as a whole, a hollow cylindrical shape. More specifically, the stator coil 140 is formed by first stacking the electric wires 150 to form a flat band-shaped electric wire assembly and then spirally rolling the flat band-shaped electric wire assembly by, for example, six turns into the hollow cylindrical shape.

Figure 14:
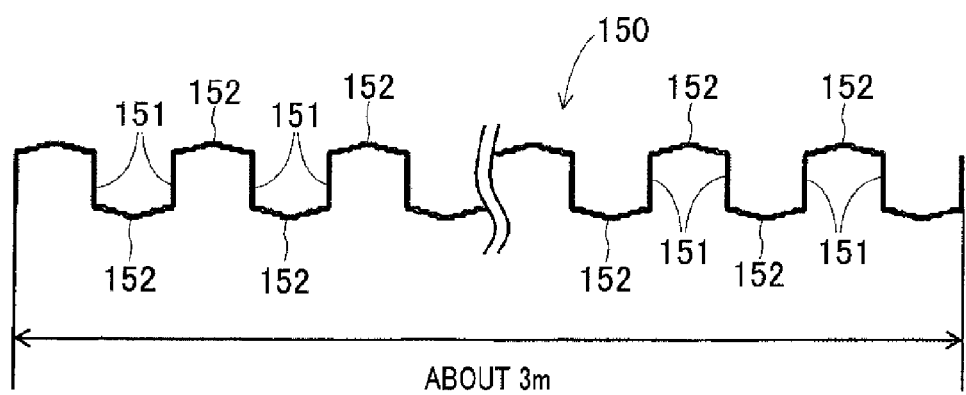
FIG. 14 is a plan view of one of continuous electric wires that together form a stator coil of the stator according to the second embodiment.

As shown in FIG. 14, each of the continuous electric wires 150 has a plurality of in-slot portions 151 and a plurality of turn portions 152. After the assembly of the stator core 130 and the stator coil 140, each of the in-slot portions 151 is received in a corresponding one of the slots 131 of the stator core 130. The turn portions 152 are located outside the slots 131 of the stator core 130 to connect adjacent in-slot portions 151 alternately on opposite axial sides of the stator core 130. The length of each of the continuous electric wires 150 is about 3 m.

Figure 15:
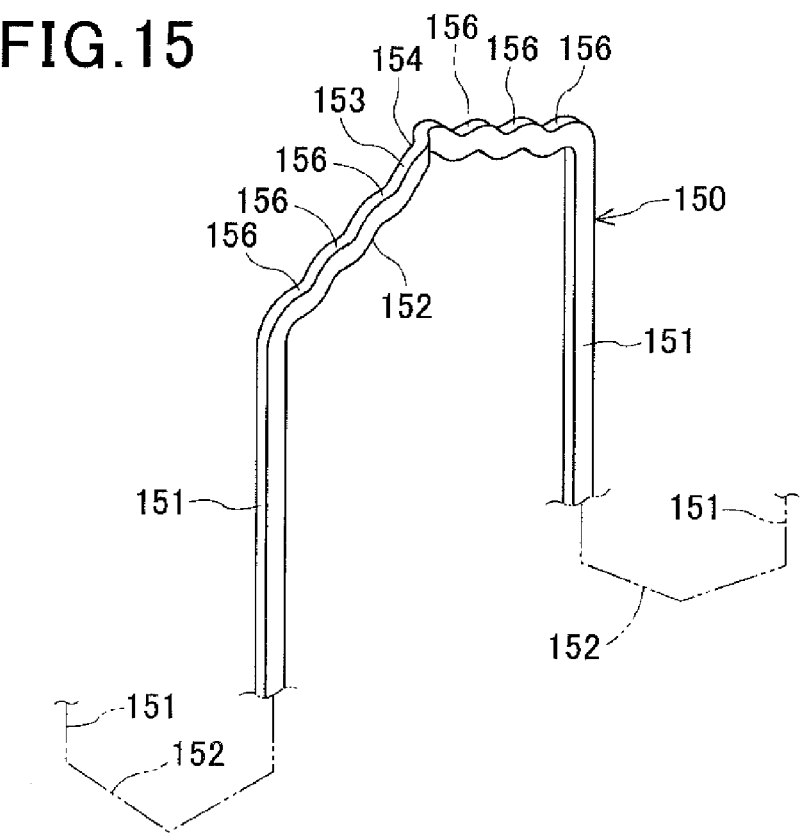
FIG. 15 is a perspective view showing a turn portion of the continuous electric wire shown in FIG. 14.

As shown in FIG. 15, each of the turn portions 152 of the continuous electric wires 150 is stair-shaped to include a plurality of step portions 153 and 156. In the finally obtained stator 120, the step portions 153 and 156 of the turn portion 152 extend parallel to an axial end face 130a of the stator core 130 and are spaced from one another in the axial direction of the stator core 130. Moreover, in the apex step portion 153 which is located at the center of the turn portion 152, there is formed a crank portion 154 that is bent into a crank shape so as to shift ends of the turn portion 152 respectively toward opposite radial sides. That is, the crank portion 154 is formed in the apex step portion 153 which has the maximum protruding height from the axial end face 130a of the stator core 130 in the turn portion 152. In addition, the detailed configuration of the turn portions 152 of the continuous electric wires 150 is almost the same as that of the turn portions 52 of the electric wire segments 50 (see FIG. 4) in the first embodiment.

Figure 5:
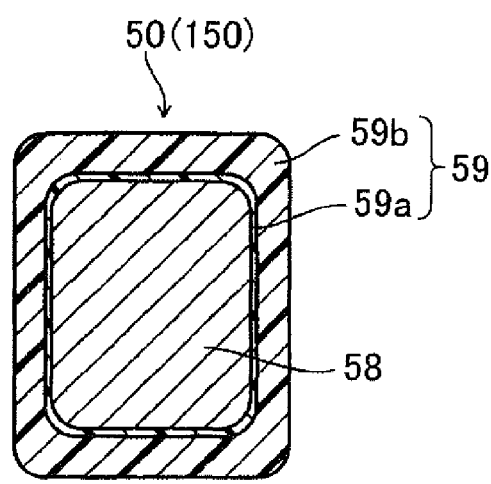
FIG. 5 is a cross-sectional view taken along the line V-V in FIG. 4.

Moreover, in the present embodiment, each of the continuous electric wires 150 forming the stator coil 140 includes an electric conductor 58 and an insulating coat 59 that covers the outer surface of the electric conductor 58 (see FIG. 5). The electric conductor 58 is made, for example, of copper and has a substantially rectangular cross section. The insulating coat 59 is two-layer structured to include an inner coat 59a and an outer coat 59b that is formed outside the inner coat 59a.

Figure 16:
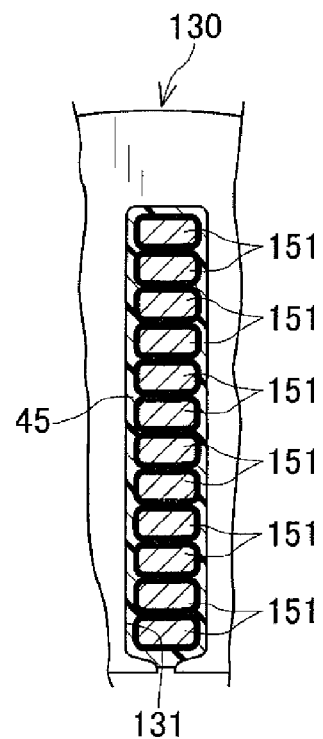
FIG. 16 is a partially cross-sectional view of part of the stator according to the second embodiment.

In assembling the stator core 130 and the stator coil 140, the teeth 134 of the stator core segments 132 are respectively inserted into the spaces formed between stacks of the in-slot portions 151 of the continuous electric wires 150 from the radially outside of the hollow cylindrical stator coil 140; each of the stacks includes a predetermined number (e.g., 12 in the present embodiment) of the in-slot portions 151 of the continuous electric wires 150 which are radially aligned with each other (see FIG. 16). Then, the outer cylinder 137 is shrink-fitted on the radially outer surfaces of the stator core segments 132 so as to fasten them together to form the stator core 130. Consequently, the stator core 130 and the stator coil 140 are assembled so that: the in-slot portions 151 of the continuous electric wires 150 are respectively received in the corresponding slots 131 of the stator core 130; and the turn portions 152 of the continuous electric wires 150 are located outside the slots 131 of the stator core 130.

More specifically, in the present embodiment, for each of the continuous electric wires 150, the in-slot portions 151 of the continuous electric wire 150 are respectively received in the corresponding slots 131 which are circumferentially spaced from one another at, for example, a six-slot pitch (i.e., 3 (the number of phases)×2 (the slot multiplier number) =6). Moreover, all the turn portions 152 of the continuous electric wires 150 together constitute first and second coil end parts 141 and 142 of the stator coil 140 which respectively protrude from opposite axial end faces 130a of the stator core 130 (see FIG. 11).

Furthermore, in the present embodiment, as shown in FIG. 16, in each of the slots 131 of the stator core 130, there are received a total of twelve in-slot portions 151 of the continuous electric wires 150 in radial alignment with each other. Further, the twelve in-slot portions 151 are fixed to the wall surface of the slot 131 by the varnish 45 which is filled and solidified in the slot 131. Moreover, to improve the vibration resistance of the stator coil 140, the varnish 45 is also applied to the first and second coil end parts 141 and 142 of the stator coil 140.

In the present embodiment, for each of the insulating coats 59 of the continuous electric wires 150 forming the stator coil 140, the adhesion strength of the outer coat 59b of the insulating coat 59 to the varnish 45 is set to be lower than the adhesion strength of the inner coat 59a of the insulating coat 59 to the varnish 45.

Consequently, the stator 120 according to the present embodiment has the same advantages as the stator 20 according to the first embodiment.

More specifically, in the present embodiment, when cracks are generated in the varnish 45 filled in the slots 131 of the stator core 130 and/or in the varnish 45 applied to the first and second coil end parts 141 and 142 of the stator coil 140 due to a shock involved in operation of the rotating electric machine 1 or a change in ambient temperature, it is possible to prevent the cracks from progressing to the outer coats 59b of the insulating coats 59 of the continuous electric wires 150. As a result, it is possible to prevent the cracks from reaching the electric conductors 58 of the continuous electric wires 150, thereby reliably preventing puncture of the insulating coats 59 of the continuous electric wires 150.

While the above particular embodiments have been shown and described, it will be understood by those skilled in the art that various modifications, changes, and improvements may be made without departing from the spirit of the present invention.

For example, in the previous embodiments, the stator coil 40 (or the stator coil 140) is fixed by filling the varnish 45 into the slots 31 of the stator core 30 (or the slots 131 of the stator core 130) and applying the varnish 45 to the first and second coil end parts 41 and 42 of the stator coil 40 (or the first and second coil end parts 141 and 142 of the stator coil 140). However, it is also possible to perform only one of the filling of the varnish 45 into the slots 31 (or the slots 131) and the application of the varnish 45 to the first and second coil end parts 41 and 42 (or the first and second coil end parts 141 and 142).

Moreover, in the previous embodiments, the present invention is applied to the inner rotor-type rotating electric machine 1. However, the present invention can also be applied to an outer rotor-type rotating electric machine in which a rotor is rotatably disposed radially outside a stator.

Furthermore, in the previous embodiments, the rotating electric machine 1 is configured as a motor-generator that can selectively function either as an electric motor or as an electric generator. However, the present invention can also be applied to other rotating electric machines, such as an electric motor and an electric generator.

What is claimed is:

1. A stator for a rotating electric machine, the stator comprising:
    an annular stator core having a plurality of slots formed therein, the slots being spaced from one another in a circumferential direction of the stator core;
    a stator coil comprised of a plurality of electric wires that are mounted on the stator core so as to be received in the slots of the stator core; and
    a resin adhesive that is filled in the slots of the stator core to fix the electric wires in the slots,
    wherein
    each of the electric wires includes an electric conductor and an insulating coat that covers an outer surface of the electric conductor,
    the insulating coat is two-layer structured to include an inner coat and an outer coat that is formed outside the inner coat, and
    an adhesion strength of the outer coat to the resin adhesive is lower than an adhesion strength of the inner coat to the resin adhesive.

2. The stator as set forth in claim 1, wherein each of the electric wires is formed of a predetermined number of electric wire segments,
    each of the electric wire segments is substantially U-shaped to have a pair of straight portions extending parallel to each other and a turn portion connecting ends of the straight portions on the same side,
    the straight portions are respectively inserted in a corresponding pair of the slots of the stator core, with the turn portion located outside the corresponding slots on a first axial side of the stator core and free end parts of the straight portions respectively protruding axially outside the corresponding slots on a second axial side of the stator core,
    the free end parts of the straight portions are bent to form a pair of oblique portions of the electric wire segment, the oblique portions extending toward opposite circumferential sides and obliquely at a predetermined angle with respect to an axial end face of the stator core, and corresponding ends of the oblique portions of the electric wire segments are joined and thus electrically connected to one another.

3. The stator as set forth in claim 2, wherein each of the turn portions of the electric wire segments is stair-shaped to include a plurality of step portions that extend parallel to the axial end face of the stator core and are spaced from one another in an axial direction of the stator core.

4. The stator as set forth in claim 1, wherein each of the electric wires is formed of a continuous electric wire which includes a plurality of in-slot portions and a plurality of turn portions, the in-slot portions extending parallel to each other and being respectively received in corresponding ones of the slots of the stator core, the turn portions connecting adjacent in-slot portions alternately on opposite axial sides of the stator core.

5. The stator as set forth in claim 4, wherein each of the turn portions of the electric wires is stair-shaped to include a plurality of step portions that extend parallel to an axial end face of the stator core and are spaced from one another in an axial direction of the stator core.

6. A rotating electric machine comprising:
the stator as set forth in claim 1;
a rotor that is rotatably disposed in radial opposition to the stator; and
a coolant supplier configured to supply a liquid coolant to the stator.

7. The rotating electric machine as set forth in claim 6, wherein the electric wires are partially received in the slots of the stator core so that the stator coil has a pair of coil end parts protruding outside the slots respectively from opposite axial end faces of the stator core, and
the coolant supplier is configured to supply the liquid coolant to the coil end parts of the stator coil.

8. A stator for a rotating electric machine, the stator comprising:
an annular stator core having a plurality of slots formed therein, the slots being spaced from one another in a circumferential direction of the stator core;
a stator coil comprised of a plurality of electric wires mounted on the stator core, the electric wires being partially received in the slots of the stator core so that the stator coil has a pair of coil end parts protruding outside the slots respectively from opposite axial end faces of the stator core; and
a resin adhesive that is applied to the coil end parts of the stator coil to fix the electric wires at the coil end parts, wherein
each of the electric wires includes an electric conductor and an insulating coat that covers an outer surface of the electric conductor,
the insulating coat is two-layer structured to include an inner coat and an outer coat that is formed outside the inner coat, and
an adhesion strength of the outer coat to the resin adhesive is lower than an adhesion strength of the inner coat to the resin adhesive.

9. The stator as set forth in claim 8, wherein each of the electric wires is formed of a predetermined number of electric wire segments,
each of the electric wire segments is substantially U-shaped to have a pair of straight portions extending parallel to each other and a turn portion connecting ends of the straight portions on the same side,
the straight portions are respectively inserted in a corresponding pair of the slots of the stator core, with the turn portion located outside the corresponding slots on a first axial side of the stator core and free end parts of the straight portions respectively protruding axially outside the corresponding slots on a second axial side of the stator core,
the free end parts of the straight portions are bent to form a pair of oblique portions of the electric wire segment, the oblique portions extending toward opposite circumferential sides and obliquely at a predetermined angle with respect to an axial end face of the stator core,
corresponding ends of the oblique portions of the electric wire segments are joined and thus electrically connected to one another,
all the turn portions of the electric wire segments together constitute one of the coil end parts of the stator coil on the first axial side of the stator core, and
all the oblique portions of the electric wire segments together constitute the other coil end part on the second axial side of the stator core.

10. The stator as set forth in claim 9, wherein each of the turn portions of the electric wire segments is stair-shaped to include a plurality of step portions that extend parallel to the axial end face of the stator core and are spaced from one another in an axial direction of the stator core.

11. The stator as set forth in claim 8, wherein each of the electric wires is formed of a continuous electric wire which includes a plurality of in-slot portions and a plurality of turn portions, the in-slot portions extending parallel to each other and being respectively received in corresponding ones of the slots of the stator core, the turn portions connecting adjacent in-slot portions alternately on opposite axial sides of the stator core, and
all the turn portions of the electric wires located on one of the opposite axial sides of the stator core together constitute one of the coil end parts of the stator coil, and all the turn portions of the electric wires located on the other axial side of the stator core together constitute the other coil end part of the stator coil.

12. The stator as set forth in claim 11, wherein each of the turn portions of the electric wires is stair-shaped to include a plurality of step portions that extend parallel to the axial end face of the stator core and are spaced from one another in an axial direction of the stator core.

13. A rotating electric machine comprising:
the stator as set forth in claim 8;
a rotor that is rotatably disposed in radial opposition to the stator; and
a coolant supplier configured to supply a liquid coolant to the stator.

14. The rotating electric machine as set forth in claim 13, wherein the coolant supplier is configured to supply the liquid coolant to the coil end parts of the stator coil.

\* \* \* \* \*